United States Patent
Song et al.

(10) Patent No.: US 10,832,738 B2
(45) Date of Patent: *Nov. 10, 2020

(54) COMPUTERIZED SYSTEM AND METHOD FOR AUTOMATICALLY GENERATING HIGH-QUALITY DIGITAL CONTENT THUMBNAILS FROM DIGITAL VIDEO

(71) Applicant: OATH INC., New York, NY (US)

(72) Inventors: Yale Song, New York, NY (US); Jordi Vallmitjana, New York, NY (US); Miriam Redi, London (GB); Alejandro Jaimes, Brooklyn, NY (US)

(73) Assignee: OATH INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,851

(22) Filed: May 7, 2018

(65) Prior Publication Data

US 2018/0254070 A1  Sep. 6, 2018

Related U.S. Application Data

(63) Continuation of application No. 15/250,990, filed on Aug. 30, 2016, now Pat. No. 9,972,360.

(51) Int. Cl.
*H04N 7/10* (2006.01)
*H04N 7/025* (2006.01)
(Continued)

(52) U.S. Cl.
CPC .......... *G11B 27/34* (2013.01); *G06K 9/00751* (2013.01); *G06K 9/036* (2013.01);
(Continued)

(58) Field of Classification Search
CPC ..... H04N 21/23418; H04N 21/234363; H04N 21/2668; H04N 21/2743; H04N 21/4316;
(Continued)

(56) References Cited

U.S. PATENT DOCUMENTS 5,881,242 A   3/1999  Ku et al.
6,137,544 A   10/2000 Dimitrova et al.
(Continued)

*Primary Examiner* — Mulugeta Mengesha
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods automatically generate a thumbnail image from a frame of a video file, where the thumbnail image displays content of a selected frame determined to be high-quality and highly-relevant to the content of the video file. Frames of a video file are analyzed, and the frame that is the most contextually relevant to the video and of the highest visual quality is selected, where a thumbnail image is generated and displayed on a site or application over a network.

18 Claims, 7 Drawing Sheets

(51) Int. Cl.
*G11B 27/34* (2006.01)
*G06K 9/00* (2006.01)
*H04N 21/81* (2011.01)
*G06K 9/03* (2006.01)
*G11B 27/28* (2006.01)
*H04N 21/2743* (2011.01)
*H04N 21/482* (2011.01)
*H04N 21/234* (2011.01)
*H04N 21/2343* (2011.01)
*H04N 21/2668* (2011.01)
*H04N 21/431* (2011.01)
*H04N 21/44* (2011.01)

(52) U.S. Cl.
CPC ....... *G11B 27/28* (2013.01); *H04N 21/23418* (2013.01); *H04N 21/234363* (2013.01); *H04N 21/2668* (2013.01); *H04N 21/2743* (2013.01); *H04N 21/4316* (2013.01); *H04N 21/44008* (2013.01); *H04N 21/4828* (2013.01); *H04N 21/812* (2013.01)

(58) Field of Classification Search
CPC ......... H04N 21/44008; H04N 21/4828; H04N 21/812; G06K 9/00751; G06K 9/4652; G06K 9/6223; G11B 27/34
See application file for complete search history.

(56) References Cited

U.S. PATENT DOCUMENTS

| | | | |
|---|---|---|---|
| 6,496,228 | B1 | 12/2002 | McGee et al. |
| 7,953,736 | B2 | 5/2011 | Rinearson et al. |
| 9,715,731 | B2* | 7/2017 | Desnoyer .................. G06T 7/55 |
| 9,799,376 | B2 | 10/2017 | Wang et al. |
| 9,953,042 | B1* | 4/2018 | Coburn .................. G06F 16/22 |
| 10,074,015 | B1* | 9/2018 | Grundmann ....... G06K 9/00765 |
| 2002/0059584 | A1 | 5/2002 | Ferman et al. |
| 2004/0136460 | A1* | 7/2004 | Zhang .................... G11B 27/28 |
| | | | 375/240.16 |
| 2004/0255249 | A1 | 12/2004 | Chang et al. |
| 2005/0204059 | A1 | 9/2005 | Namihira |
| 2007/0043875 | A1 | 2/2007 | Brannon |
| 2009/0208118 | A1 | 8/2009 | Csurka |
| 2012/0281969 | A1 | 11/2012 | Jiang et al. |
| 2013/0110837 | A1 | 5/2013 | Dai et al. |
| 2013/0336590 | A1* | 12/2013 | Sentinelli ............... H04N 5/772 |
| | | | 382/218 |
| 2014/0205266 | A1 | 7/2014 | Atri et al. |
| 2014/0321770 | A1 | 10/2014 | Potdar |
| 2015/0222919 | A1 | 8/2015 | Licata |
| 2017/0091558 | A1 | 3/2017 | Smolic et al. |
| 2019/0014063 | A1* | 1/2019 | Melenboim ............ H04L 51/10 |

* cited by examiner

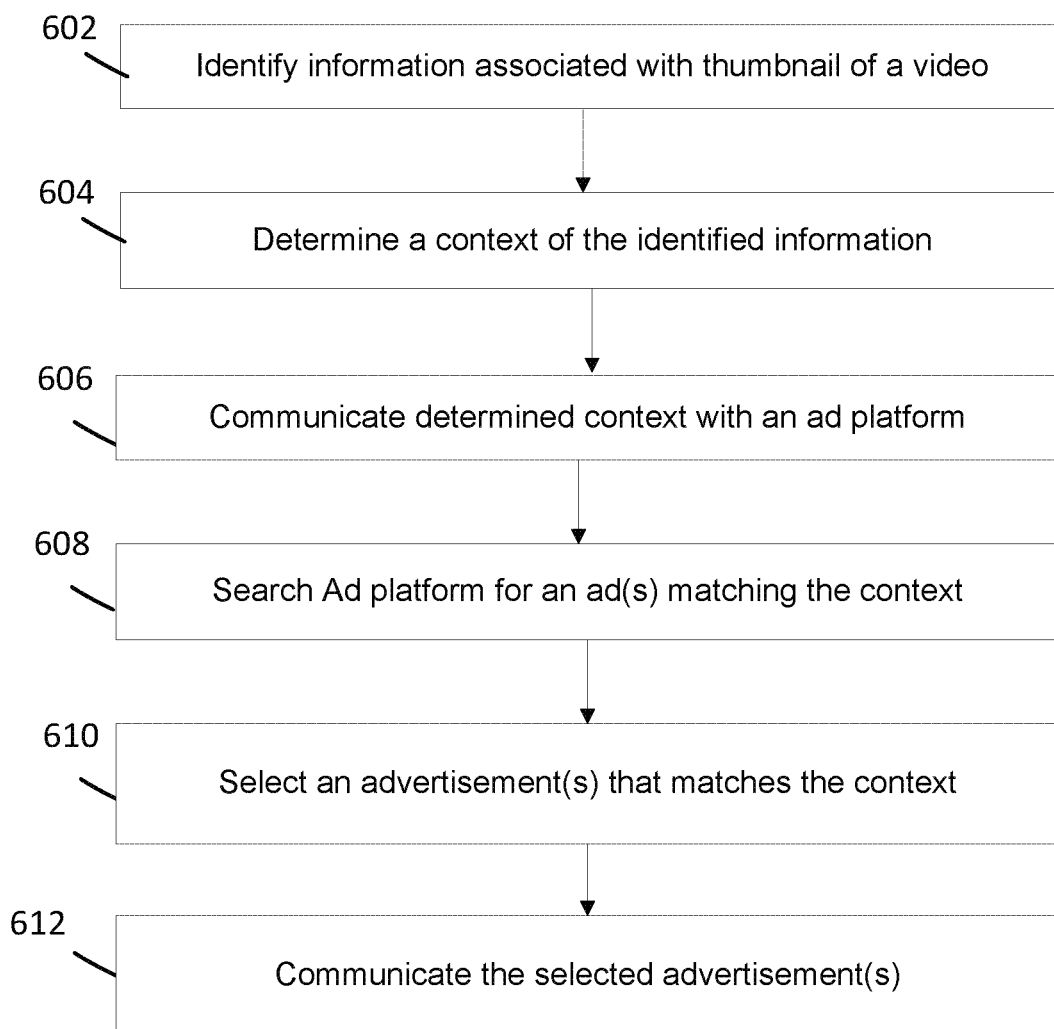

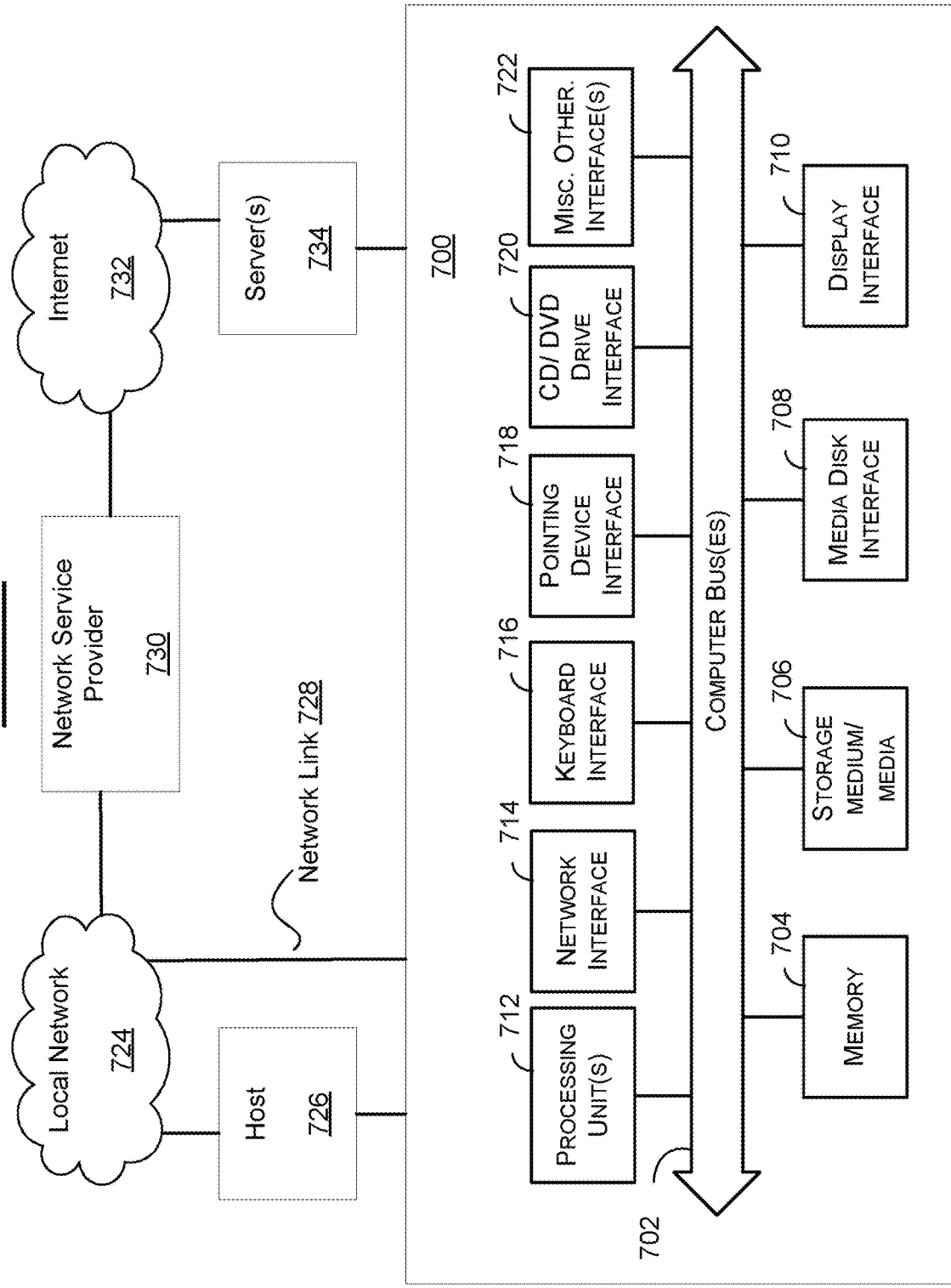

COMPUTERIZED SYSTEM AND METHOD FOR AUTOMATICALLY GENERATING HIGH-QUALITY DIGITAL CONTENT THUMBNAILS FROM DIGITAL VIDEO

CROSS REFERENCE TO RELATED APPLICATION

This application is a continuation of, and claims priority from U.S. patent application Ser. No. 15/250,990, filed on Aug. 30, 2016, which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing, recommending and/or hosting computer systems and/or platforms by modifying the capabilities and providing non-native functionality to such systems and/or platforms for a novel and improved framework for automatically selecting, determining, identifying and/or generating a thumbnail image from a video file, where the thumbnail image displays a selected image frame from the video file determined to be high-quality and highly-relevant to the context of the video file.

SUMMARY

Thumbnail images play an important role in online videos. As the most representative snapshot of a video file, thumbnails capture the essence of a video and provide the first impression to viewers. In practice, a thumbnail that captures the viewer's attention will make the video more attractive to the viewer to click and watch the associated video.

The disclosed systems and methods implement two important characteristics commonly associated with meaningful and attractive thumbnails: high relevance to video content and superior visual aesthetic quality. The disclosed systems and methods utilize these two characteristics in combination with one-another in order to generate improved quality thumbnails for video.

In some embodiments, the disclosed systems and methods involve analyzing various visual quality and aesthetic metrics of video frames of a video file, and performing a computerized clustering analysis to determine the relevance of the content of the frames to the video content, thus making the resulting thumbnails, which are generated from the video frames, more representative of the video.

In some embodiments, the selection of a quality frame as a thumbnail is correlated with the objective visual quality metrics of the frame's content, such as, for example, the frame texture and sharpness. Thus, according to some embodiments, the disclosed systems and methods determine the quality of a thumbnail by analyzing the statistical relationship between video frames identified as potential thumbnail frames and non-thumbnail frames in terms of various image quality features.

According to some embodiments, as discussed herein, the disclosed systems and methods automatically select a frame of a video file as a thumbnail(s) that is to be displayed on a web page, application or other form of electronic document that displays selectable and renderable content on the interne. As discussed in more detail below, the thumbnail(s) is automatically generated based upon an ordered or weighted, computationally determined combination of both relevance and visual aesthetic quality analysis of the frames of the video. Accordingly, in one or more embodiments, a method is disclosed for a novel and improved framework for automatically selecting, determining, identifying and/or generating a thumbnail image from a video file, where the thumbnail image displays a selected frame from the video file determined to be high-quality and highly-relevant to the context of the video file.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically selecting, determining, identifying and/or generating a thumbnail image from a video file, where the thumbnail image displays a selected frame from the video file determined to be high-quality and highly-relevant to the context of the video file.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
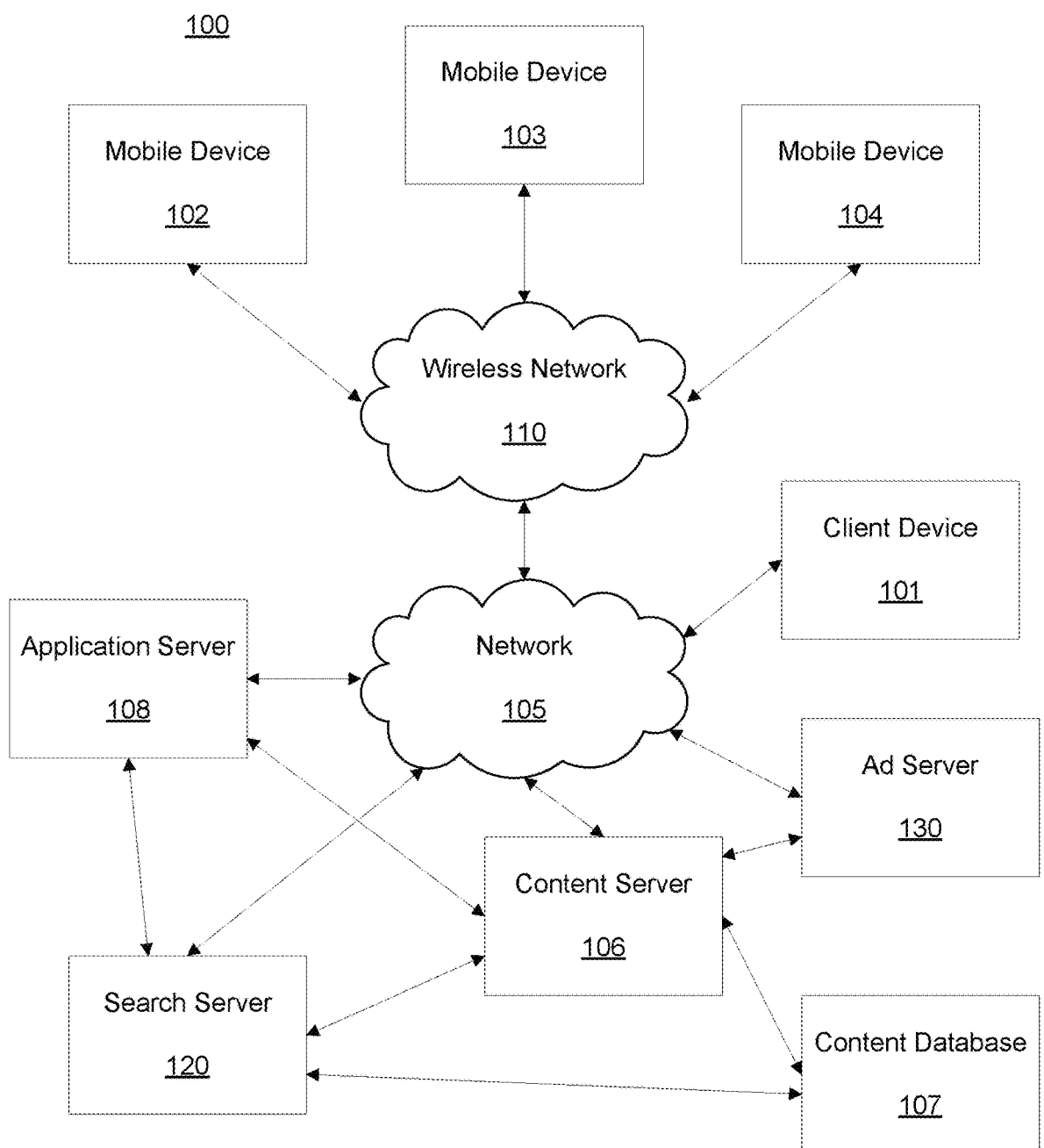
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. By way of background, thumbnail images are displayed on a webpage, web site, application interface or any other form of electronic document or interface in order to provide a representative view of the content of the associated file. It is generally understood that people look at thumbnails extensively when browsing online videos, and are often a crucial decision factor in determining whether to watch a video or skip to another. Indeed, due to their importance, video producers and editors put an increasing amount of effort into selecting meaningful and attractive thumbnails, such that when they are displayed on network sites, for example, Yahoo! ® News, Sports or Finance, Tumblr®, Flickr®, and the like, they are more likely to draw the attention and curiosity of the viewing user, thereby leading to user engagement in the content. Unfortunately, manual selection of thumbnails can be cumbersome in many scenarios. For example, user generated videos, such as the ones uploaded to Flickr® and Tumblr®, generally do not have thumbnails—e.g., videos produced and delivered by third parties sometimes come without thumbnails. Selecting a thumbnail manually from even a few minutes of those videos can be extremely time consuming and sometimes inaccurate, making it difficult to scale.

Thus, the present disclosure provides an automatic thumbnail selection system and method. The disclosed systems and methods exploit two important characteristics commonly associated with meaningful thumbnails: high relevance to video content and superior aesthetic quality. In practice, selecting a thumbnail based solely on a frame's relevance to the content of a video is insufficient because people are naturally drawn to attractive images. For example, the frame may be relevant, but may be dark, blurry or otherwise a low quality image that actually derails the user's interest. Superior aesthetic quality alone is similarly insufficient because videos with attractive, but irrelevant thumbnails (e.g., clickbaits) may lead to user disappointment, which could ultimately result in negative reviews and harm the reputation of video providers.

According to some embodiments, the disclosed systems and methods automatically select frames of a video file as thumbnails by analyzing various visual quality and aesthetic metrics of video frames, and performing computerized clustering analysis to determine the relevance to video content, thus making resulting thumbnails more representative of the video. While conventional thumbnail selection systems have addressed similar aspects before (e.g., by alone selecting thematic, query-sensitive, and interesting thumbnails), the ability to consider both the relevance and the attractiveness for thumbnail selection is novel and unique to the disclosed system and methods.

The disclosed automatic thumbnail selection systems and methods discussed herein are based on the understanding that a quality thumbnail is highly correlated with objective visual quality metrics, such as, for example, the frame texture, sharpness and inclusion of interesting "things" (e.g., face, object, text, and the like), rather than the standard photographic beauty rules, such as the Rule of Thirds. The automatic selection of a thumbnail leverages the relevance to video content and the visual attractiveness of the image frames within the video. Thus, the disclosed systems and methods automatically generate a thumbnail(s) from a selected image frame(s) of a video based upon an ordered or weighted, computationally determined combination of both relevance and visual aesthetic quality of the frames of the video, as discussed in more detail below.

For purposes of this disclosure, the selection of a thumbnail will be in large measure directed to analyzing image frames (referred to interchangeably as a "video frame") of a video file; however, it should not be construed as limiting the scope of the instant application to solely videos or the individual frames of videos, as any known or to be known type of content, media and/or multi-media (e.g., text, audio, multi-media, RSS feeds, graphics interchange format (GIF) files, and the like) is applicable to the disclosed systems and methods discussed herein.

For purposes of this disclosure, the term "frames" refers to the entire video frames of a video, while reference to a "frame" refers to an individual frame. "Keyframes" refers to a compact and non-redundant subset of the video frames. A "thumbnail" refers to the selected frame of a video determined to be the most attractive (or "high-quality," used interchangeably) and representative (or "relevant" or "highly relevant," used interchangeably) to the content or context of the video, as discussed in more detail below.

As understood by those of skill in the art, the term "high-quality" refers to an item (e.g., a frame) of digital content satisfying a quality threshold, which can be set by a user, site administrator, artist creating/capturing the content, the system, service or platform hosting the content, or some combination thereof. In a non-limiting example, "high-quality" content can relay that the digital content is aesthetically pleasing or technically sound, in that the data associated with the content produces a resolution, focus, pixel quality, size, dimension, color scheme, exposure, sharpness, stillness, white balance and the like, or some combination thereof, that satisfies the quality threshold. For example, video frame's quality can be determined via implementation of a pair-wise loss function which scores the frame's quality based on the frame's parameters or features. In another non-limiting example, "high-quality" can refer to the digital content being of interest to a user(s), where interest (or user engagement) can be based on the number of times a user has interacted with the content (e.g., viewed, shared, commented, downloaded, re-blogged, re-posted, favorited, liked, and the like) at or above the quality threshold.

As understood by those of skill in the art, the term or terms "relevant" or "highly-relevant" refers to an item of digital content satisfying a relevance threshold, which can be set by a user, site administrator, artist creating/capturing the content, the system, service or platform hosting the content, or some combination thereof. As discussed herein, relevancy can be quantified (or scored). For example, as discussed above, a frame's relevancy can be determined via implementation of a logistic loss function which quantifies a frame's parameters or features. In another non-limiting example, relevancy can be based on a discounted cumulative gain (DCG) measure of ranking quality. As understood by those of skill in the art, DCG can measure the effectiveness of web search engine algorithms or related applications by analyzing the returned results against a graded relevance scale of content items in a search engine result set. DCG measures the usefulness, or gain, of a content item based on its position in the result list. The gain is accumulated from the top of the result list to the bottom with the gain of each result discounted at lower ranks.

The disclosed systems and methods improve a computer or network platform's or provider's performance of the implementation of technologies for multi-media analysis. Such technologies include thumbnail selection, video highlighting and summarization, and computation aesthetics.

Turning to conventional thumbnail selection technologies, few have specifically addressed thumbnail selection, i.e. automatic extraction of a single most representative frame from a video sequence. One known system uses a thematic thumbnail selection framework, which chooses a thumbnail frame that has the most common visual characteristics shared with an extra set of web images, obtained using keywords from the video. Similarly, another system uses a query-specific thumbnail selection algorithm that extracts a frame that is both representative of video content and is specific to the intent of user query by matching query words and frame content using visual concept detectors. And, another system is embodied as a query-dependent thumbnail selection method using embedding of visual and textual signals.

While these known systems approached thumbnail selection from various perspectives, little attention has been paid on the attractiveness of the thumbnails, i.e. their capability to attract the users' attention using visual quality and aesthetics criteria. The disclosed systems and methods are explicitly designed to discover attractive thumbnails using several visual quality metrics and computational aesthetics, as discussed herein. Moreover, the performances of existing frameworks are evaluated either on a small number of videos or with a rather too simple design of experiments (e.g., compared against either no baseline or only one baseline that selects the middle frame of a video). The disclosed systems and methods can be evaluated against six baseline approaches on a vastly superior set of videos than those of the existing art—for example, a set of 1,118 videos, which is the largest of its kind.

The goal of conventional video highlighting technologies is to find the most important segments from a video. Conventional video summarization technologies goes a step further and aims to generate the "gist" of a video by selecting a few highlight frames or segments so that they deliver the video content in the most compact form. While the two tasks have slightly different goals from thumbnail selection, there has been an overlap of techniques used. For example, one known system uses a sparse dictionary selection approach which aims to reconstruct a video sequence from only a few "basis frames" from the video using a machine learning statistical/regression analysis algorithm, such as, group LASSO (least absolute shrinkage and selection operator). Another conventional approach extends this approach into an online dictionary learning problem. Central to these techniques is content non-redundancy in the summary. The discloses systems and methods, however, not only removes redundant frames, but also accounts for visual quality and aesthetics to select a single high-quality thumbnail, which none of the known systems contemplates when analyzing media content.

Further, other known approaches: use 1) the title and description to identify important segments in a video, 2) use animated GIFs to identify the most GIF-able segments; and 3) use visual co-occurrence across multiple videos to measure visual interestingness. The disclosed systems and methods are different in that, while they use visual and textual cues to identify "interesting" frames, the disclosed systems and methods directly assess the photographic attractiveness to identity high-quality frames.

Conventional computational aesthetics techniques aim to automatically assess the photographic quality of images using visual analysis techniques. One known approach, which appeared in the field less than a decade ago, distinguishes amateur from professional photographs based on visual features inspired by a photographic theory. Since then, computational aesthetics techniques have mainly been applied to the task of aesthetic image classification and ranking. Other known applications include video creativity assessment, video interestingness estimation, and machine-assisted image composition and enhancement. However, none of the known techniques evaluate the visual aesthetic quality of video frames for automatic thumbnail selection in accordance with the relevance of the frames, as disclosed herein.

As discussed in more detail below at least in relation to FIG. 6, according to some embodiments, information associated with or derived from media including, but not limited to, videos, video frames and determined thumbnails associated with such videos can be used for monetization purposes and targeted advertising when providing, delivering or enabling access to such media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a photo sharing site/service (e.g., Tumblr®), an email platform or social networking site, a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), a mail or messaging application (e.g., Yahoo!® Mail, Yahoo! ® Messenger), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
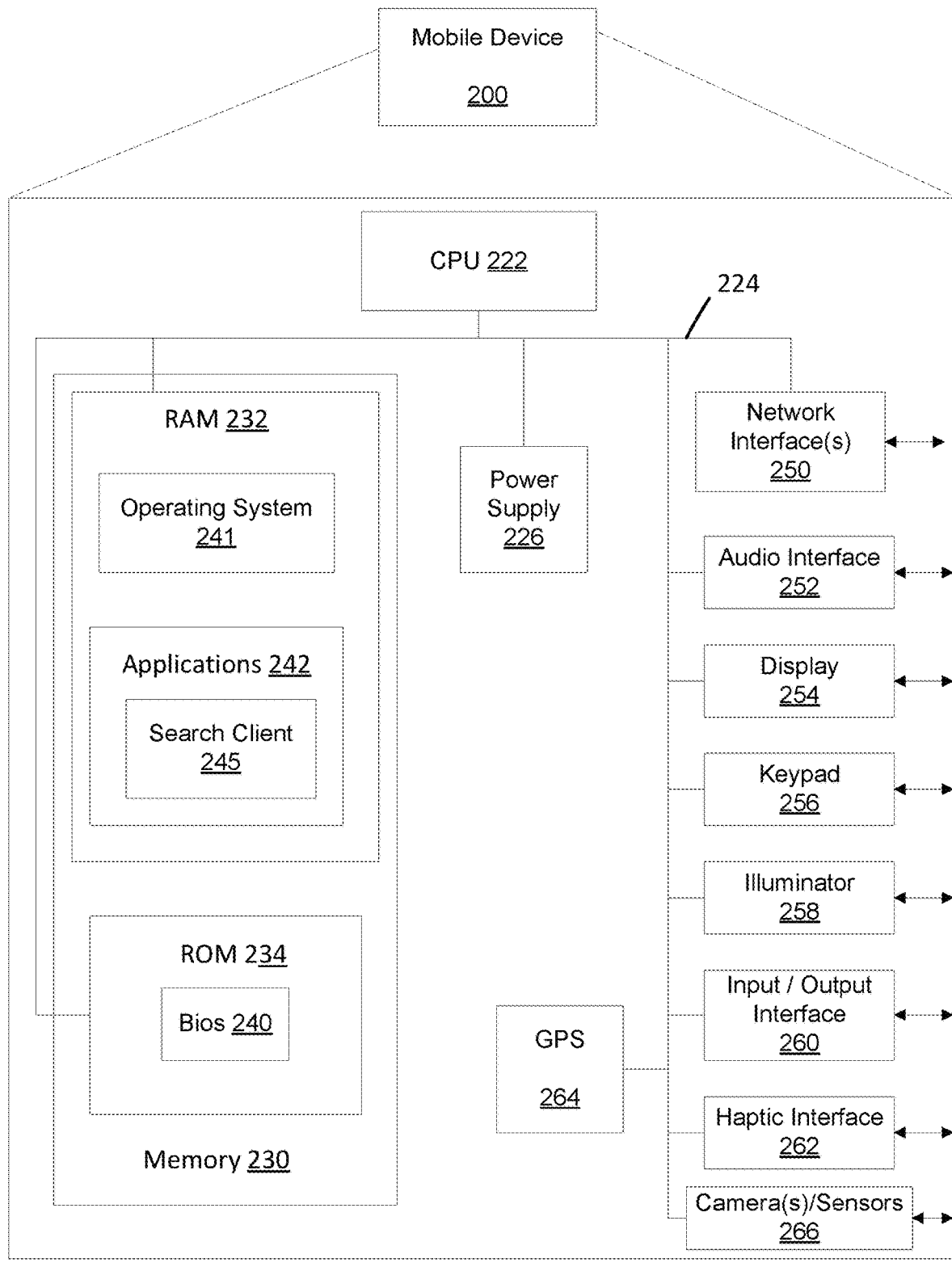
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
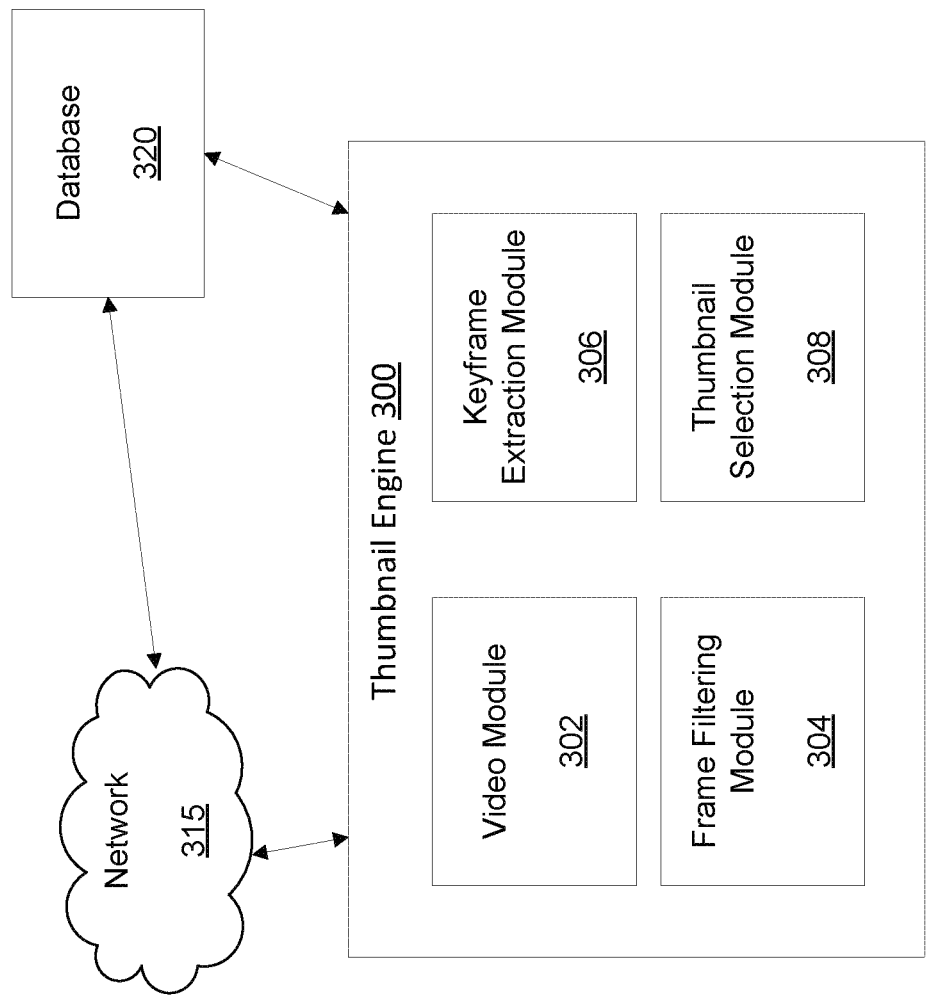
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a thumbnail engine 300, network 315 and database 320. The thumbnail engine 300 can be a special purpose machine or processor and could be hosted by an application server, content server, social networking server, web server, search server, content provider, email service provider, ad server, user's computing device, and the like, or any combination thereof.

According to some embodiments, thumbnail engine 300 can be embodied as a stand-alone application that executes on a user device. In some embodiments, the thumbnail engine 300 can function as an application installed on the user's device, and in some embodiments, such application can be a web-based application accessed by the user device over a network. In some embodiments, the thumbnail engine 300 can be installed as an augmenting script, program or application to another media and/or content hosting/serving application, such as, for example, Yahoo!® Search, Yahoo!® Mail, Flickr®, Tumblr®, Twitter®, Instagram®, SnapChat®, Facebook®, Amazon®, YouTube® and the like.

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of content items (e.g., video files, multi-media files, images and the like), user data and associated user metadata. Such information can be stored in the database 320 independently and/or as a linked or associated dataset. It should be understood that the video data (and metadata) in the database 320 can be any type of video information and type, whether known or to be known, without departing from the scope of the present disclosure.

Database 320 comprises a dataset of data and metadata associated with local and/or network information related to users, services, applications, user-generated content, third party provided content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

For purposes of the present disclosure, as discussed above, videos (which are stored and located in database 320) as a whole are discussed within some embodiments; however, it should not be construed to limit the applications of the systems and methods discussed herein. Indeed, while reference is made throughout the instant disclosure to videos, other forms of known or to be known content types/formats and associated information, including for example graphics interchange files (GIFs) or other short form video media files, text, audio, multi-media, RSS feed information can be used without departing from the scope of the instant application, which can thereby be communicated and/or accessed and processed by the thumbnail engine 300 according to the systems and methods discussed herein.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or displaying content, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, Amazon®, YouTube®, and the like). In some embodiments, database 320 can comprise data and metadata associated with such content information from one and/or an assortment of media hosting sites.

In some embodiments, the information stored in database 320 can be represented as an n-dimensional vector (or feature vector) for each stored data/metadata item, where the information associated with, for example, the stored videos or frames of videos can corresponds to a node(s) on the vector. As such, database 320 can store and index content information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology.

While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more services and/or content providers, and in some embodiments, database 320 can be configured as a linked set of data stores that provides such information, as each datastore in the set is associated with and/or unique to a specific service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the thumbnail engine 300, and the database of stored resources 320. Indeed, as illustrated in FIG. 3, the thumbnail engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as thumbnail engine 300, and includes video module 302, frame filtering module 304, keyframe extraction module 306 and thumbnail selection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
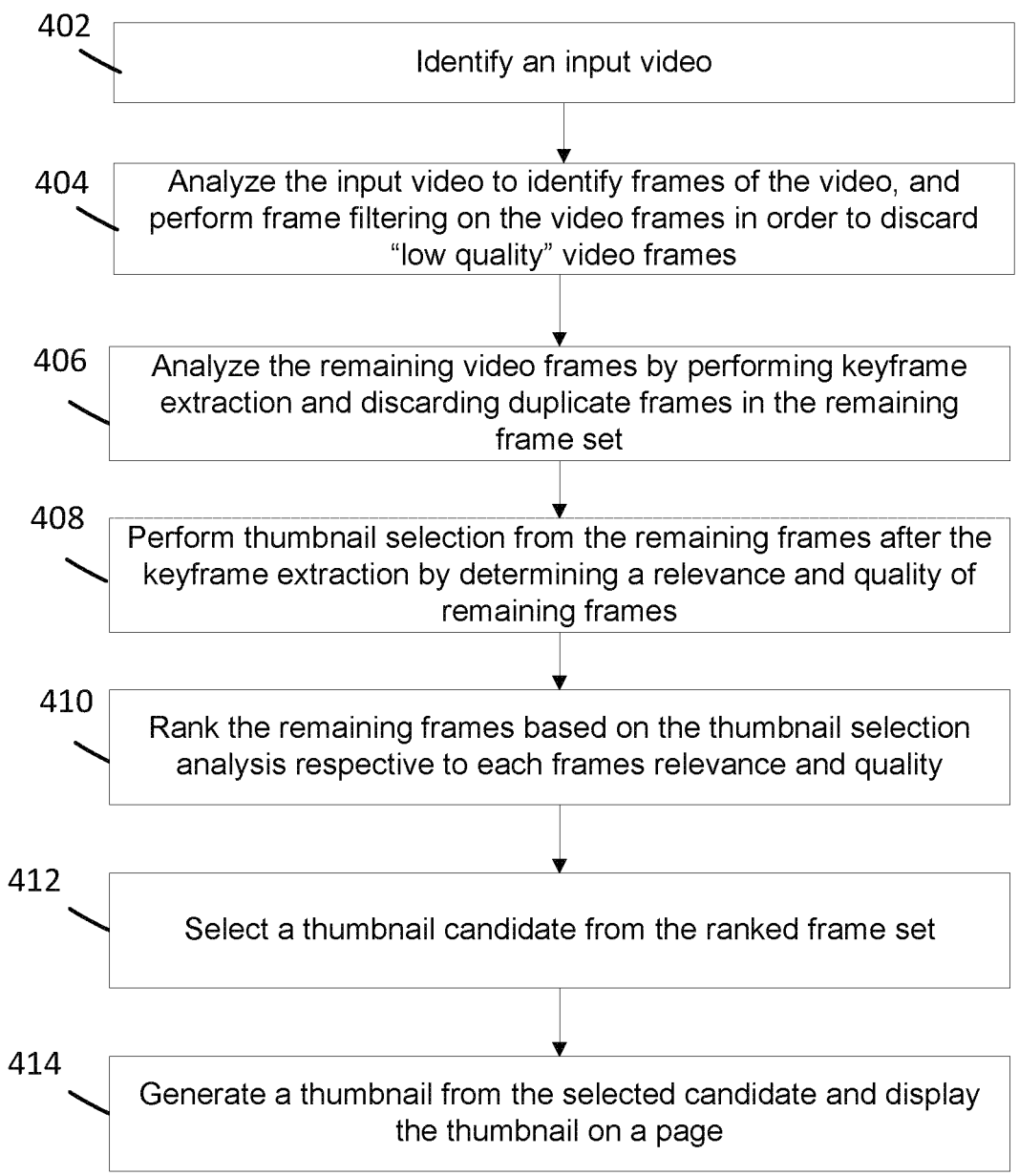
FIG. 4 is a flowchart illustrating steps performed in accordance with some embodiments of the present disclosure.

Turning to FIG. 4, Process 400 details steps performed in accordance with some embodiments of the present disclosure for automatically selecting relevant, high-quality image frames from videos to be used as thumbnails when displaying a video file, for example, on a website.

As discussed herein, the key steps of Process 400 involve: 1) frame filtering (Step 404); 2) keyframe extraction (Step 406); and 3) thumbnail selection (Step 408). As evidenced from the below discussion, the complexity of computational analysis that occurs in each step increases as Process 400 proceeds through the analysis of the video data. That is, the frame filtering in Step 404 of Process 400 involves identifying low-quality images, for example, which requires a relatively low computational complexity compared to the keyframe extraction of Step 406 and thumbnail selection of Step 408. Similarly, the keyframe extraction in Step 406 involves performing, for example, identifying duplicate or "near-duplicate" images, which has a lower computational complexity than that performed in Step 408's thumbnail selection, which involves the selection of representative and attractive frames of a video file. Process 400 is configured in such a manner so the thumbnail engine 300's time and memory usage is maximized for the tasks that require most computational resources. Indeed, the thumbnail engine 300 is designed to engage more computational power from its associated device(s) as it performs the more sophisticated tasks or processes.

Process 400 beings with Step 402 where an input video is identified or received. Step 402 is performed by the video module 302 of the thumbnail engine 300. In some embodiments, the input video can be a video file that is uploaded to a media file hosting site, service or platform, such as, for example, Tumblr®, Flickr®, Facebook®, Yahoo!® eSports, News, Sports, Finance and the like, YouTube®, Amazon®, and the like. The video file can be a user-generated content (UGC) file, a provider provided or generated file, or any type of third party provided or generated file. While the discussion herein focuses on a video file being uploaded, any action can trigger the identification of a video file for which automatic thumbnail analysis can be performed, as discussed herein, such as, for example, downloading a video, capturing a video, receiving a video (e.g., via sharing), posting a video (e.g., to a social networking platform), and the like, without departing from the scope of the instant disclosure.

In Step 404, after an input video is identified, the frame filtering module 304 is applied to the input video. As discussed herein, the analysis of the frames of the input video using the frame filtering module 304 results in the identification of a quality value/metric/determination of the frames as well as the types of frames in the video. As discussed below, the result of the frame filtering occurring in Step 404 includes the discarding of "low-quality" frames and using the remaining frames in the subsequent keyframe analysis of Step 406, as discussed in more detail below. "Low-quality" frames can include, for example, frames depicting dark, blurry, uniform content and the like, or transition frames (e.g., cut, fade, dissolve, wipe, and the like).

As will be understood by those of skill in the art, processing of the frames (i.e., all of the frames) in a video can be quite time consuming and computationally burdensome to a computing system. Many conventional video processing systems reduce the number of frames by sub sampling at a uniform time interval. However, for the purpose of the disclosed thumbnail selection Process 400 discussed herein, such subsampling methodology can actually lead to discarding of frames that would be ideal as a thumbnail, therefore making it undesirable for the disclosed techniques. As discussed herein and in more detail below, high-quality thumbnails must possess certain aesthetic qualities, e.g., brightness, sharpness, colorfulness, stillness, and the like. Avoiding the subsampling steps generic to conventional systems and applying the frame filtering module 304 in Step 404 allows the thumbnail engine 300 to reduce the number of frames by filtering out low-quality frames thereby improving processing efficiency in the later stages.

Step 404 involves parsing the video file in order to identify the frames of the video. Step 404 then involves detecting and filtering out a predetermined type of low quality frames, as discussed herein. For example, and for purposes of this discussion, the predetermined types of frames includes three (3) frame types: dark, blurry and uniform-colored; however, such discussion should not be limited as any other type of known or to be known type can be utilized without departing from the scope of the instant application.

In some embodiments, "dark frames" are filtered out by analyzing each frame of a video file by computing a relative luminance, as follows:

$$\text{Luminance}(I_{rgb}) = 0.2126 I_r + 0.7152 I_g + 0.0722 I_b \quad \text{(Eq. 1)},$$

where "rgb" refers to the RGB color space. The luminance is then subject to thresholding it using an empirically chosen value.

In some embodiments, "blurry frames" are filtered out in a similar manner by computing the sharpness, as follows:

$$\text{Sharpness}(I_{gray}) = \sqrt{((\Delta_x I\text{gray})^2 + (\Delta_y I\text{gray})^2)} \quad \text{(Eq. 2)}.$$

In some embodiments, to filter out "uniform-colored" frames, a normalized intensity histogram is first computed for an image displayed within a frame, resulting in values of intensity, the values are sorted in descending order, a cumulative distribution at a top percentage (e.g., 5%) bins is computed, and then these values are thresholded with an empirically chosen value:

$$\text{Uniformity}(I_{gray}) = \int_0^{5\%} cdf(\text{sort}(\text{hist}(I_{gray}))) dp \quad \text{(Eq. 3)}.$$

Step 404 also involves detecting and filtering out frames determined to be transition or transitioning frames. In some embodiments, such frames could also be identified as "low-quality" using the above analysis.

The identification and determination of transitioning frames occurring in Step 404 involves performing shot boundary detection. In some embodiments, the frame filtering module 304 applies a computerized shot boundary detection technique or algorithm that determines which frames within the video are transition frames. For example, the module 304 can employ a shot boundary detection technique using a methodology that computes the edge change ratio between two consecutive frames and detects a boundary with thresholding. However, implementation of such technique should not be construed as limiting, as any type of known or to be known shot boundary detection system, algorithm, or technology can be utilized herein without departing from the scope of the instant disclosure.

Step 404's determination of low-quality and/or transitioning frames from the frames of the input video file results in the removal of such frames such that the remaining frames are not identified as low-quality (they are high-quality) and are not transition frames (they correspond to scenes or shots in the video).

In Step 406, the keyframe extraction module 306 is applied to the remaining frames—i.e., the frames that remain after application of the frame filtering module 304, from Step 404—whereby the result of Step 406 involves the identification and removal (e.g., discarding) of duplicate or "near-duplicate" frames (where "near-duplicate" frames comprise content that is similar in its parameters at or above a threshold value).

As understood by those of skill in the art, a video sequence, by nature, has many near duplicate frames. The disclosed systems and methods, via the performance of Step 406 by the keyframe extraction module 306, filters out the duplicate frames via keyframe extraction, as discussed herein. Step 406 can perform keyframe extraction via any known or to be known technique or algorithm for extracting keyframes in frames of video. In some embodiments, the keyframe extraction module 306 employs a clustering analysis technique or algorithm. Cluster analysis clusters frames by their visual similarity, and selects the most representative frames, one per cluster, by selecting a frame closest to the centroid (e.g., using the k-means algorithm) or the medoid (using the k-medoids algorithm) of samples within each cluster.

Such computational steps are performed by the keyframe extraction module 306 using image aesthetics to select a frame from each cluster (especially using the "stillness" within an image of a frame, as discussed below). Such selection can be based on the identification of a blurring artifact caused by motion compensation during video compression. The keyframe extraction module 306 identifies blurred frames, via, for example, the cluster analysis and image aesthetics techniques discussed herein, when there is high motion energy detected from such analysis. In other words, sharper, higher quality keyframes are associated with frames that have determined low motion energy.

According to some embodiments, the keyframe extraction occurring in Step 406 involves determining a feature representation for the remaining frames (e.g., translating the data and metadata of the frames into a feature vector, for example). In some embodiments, such feature representations can be determined by the keyframe extraction module 306 using, or applying software defining, any known or to be known histogram analysis or vector analysis, as discussed above, or any known or to be known deep learning architecture or algorithm, such as, but not limited to, deep neural networks, artificial neural networks (ANNs), convolutional neural networks (CNNs), deep belief networks and the like.

According to some embodiments, since the goal of the keyframe analysis of Step 406 is to identify duplicate frames using the least computational energy as possible, keyframe extraction module 306 can employ de-duplication software that employs, for example, a color and edge histogram technique. While such technique is discussed herein for performing Step 406, it should not be construed as limiting, as any known or to be known computational technique for determining parameters of a frame and determining duplicates based on such parameters can be used herein, as discussed above, without departing from the scope of the instant application.

In some embodiments, Step 406 involves computing two types of features: a pyramid of HSV (hue, saturation, and value) histograms with 128 bins per channel, and a pyramid of edge orientations and magnitudes with 30 bins for each. The features are computed over a two-level spatial pyramid (five regions), resulting in a 2,220 dimensional feature vector. In some embodiments, the features of such vector are compared and the duplicate images are identified and discarded. Such comparison can involve, for example, comparing the values of the feature vector to a threshold and determining which values satisfy the threshold, and based on such threshold comparison, the frames associated with such features can be removed or remain. In some embodiments, the threshold can correspond to a predetermined distance between features in the representation/vector.

Step 406 further involves a subshot identification from the remaining frames of the video file. The frames output from Step 404 corresponds to single scenes or "shots" as the transition and low-quality frames were discarded. In some embodiments, a shot, and subsequent subshot can be determined based on the feature representation discussed above. For example, a shot can correspond to a set of features in the feature representation, or set of features within (or across) a dimension of the feature representation. Similarly, a subshot can be identified from a set of features whereby the features correspond to one another at or within a threshold value. In some embodiments, subshots (or sub-scenes) can be identified by extracting one keyframe per shot respective to a continuous block of the remaining frames (corresponding to a single "shot" or "scene"). Step 406 involves the keyframe extraction module 306 identifying subshots by clustering the remaining frames using the k-means algorithm, where the number of clusters is set according to the number of shots in a video. A subshot within a shot is then identified as a continuous block of frames with the same cluster, and a keyframe for each subshot is extracted, as discussed above.

For each frame in the identified subshots, the keyframe extraction module 306 computes a "stillness" value as an inverse of the sum-squared pixel-wise frame difference value between two time-consecutive frames. In a similar manner discussed above, the "stillness" metric represents motion energy of a frame. The "stillness" value corresponds to the motion in the frame, where the lower the value, the more "still" the content in the image frame.

Figure 5:
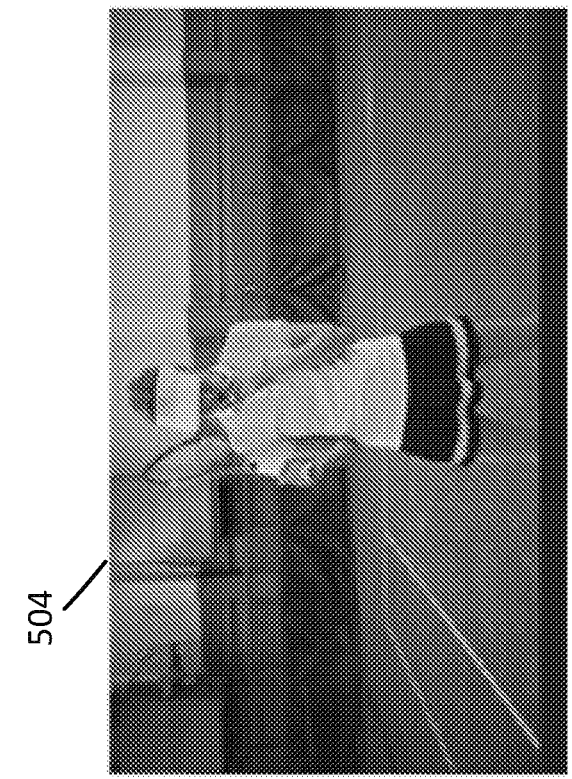
FIG. 5 is an example depiction of identified frames of a video file in accordance with some embodiments of the present disclosure.
Figure 5:
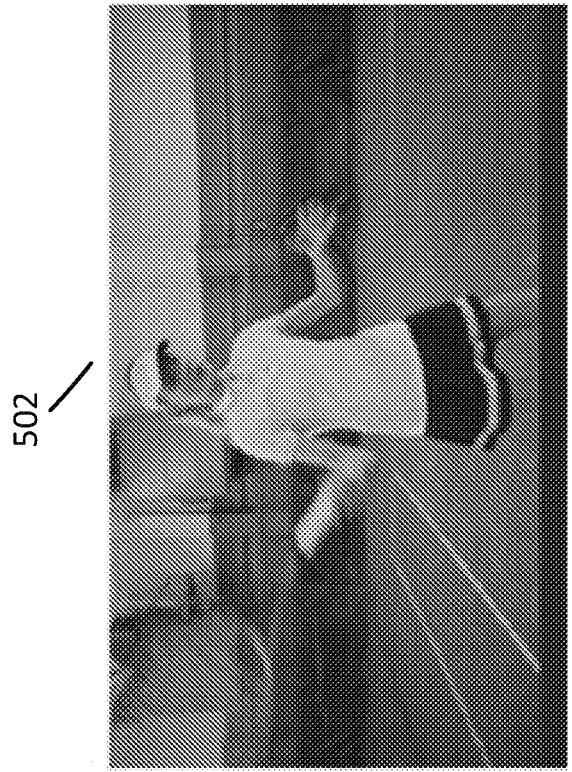

For example, as depicted in FIG. 5, two images from a subshot are displayed, and they both correspond to frames of a woman "playing" tennis. The shot 502 depicts a frame of the shot swinging her racquet; while the shot 504 depicts her still in the frame. The shot 504 has a lower minimum frame difference value—"stillness" value—therefore, shot 504 would remain after keyframe analysis of Step 406, and shot 502, which depicts high energy movement (and is blurry), would be discarded.

Turning back to Step 406, the keyframes are extracted at a rate of one per subshot and result in the identification of the "most still" image frame in the subshot (the frame with the lowest stillness value)—as depicted in FIG. 5, discussed above. In some embodiments, such extraction can be based on comparing the stillness value (or score) of keyframes to a threshold associated with motion energy, and selecting those keyframes that satisfy the threshold. This results in producing sharp keyframes that depict video content which can be viable candidates for a thumbnail.

In Step 408, a thumbnail is selected based on the remaining frames from the keyframe extraction (Step 406) that was performed on the remaining frames from the frame filtering (Step 404). Step 408 is performed by the thumbnail selection module 308. As discussed herein, Step 408 involves the thumbnail selection module 308 selecting a frame based on criteria including: "relevance" and "attractiveness" (or high-quality).

In some embodiments, as discussed herein, Step 408 involves determining a frame's relevance to the content or context of the video file, then determining the frame's quality (or attractiveness). In some embodiments, such determination can be performed in the reverse order, and in some embodiments, such determination can be performed as a linear combination of the relevance and quality, where the values of relevance and quality are weighted to account for their determined values.

According to some embodiments, Step 408 first begins with the determination of how representative the content of a frame is to the content of the video—i.e., the relevance of the frame. In some embodiments, the thumbnail selection module 308 performs clustering analysis on the frames remaining after Step 406, and measures the relevance of each keyframe based on the size of the clusters. That is, in some embodiments, the keyframes are clustered using the k-means algorithm with a gap statistic technique in order to automatically find the optimal number of clusters. Usage of the gap statistic technique involves comparing a change in within-cluster dispersion with that result under an appropriate reference null distribution. From the optimal clustering result, thumbnail candidates can be generated, one per cluster, by selecting a frame with the highest aesthetic score. Using the determined scores and cluster size, the candidates can be ranked, as in Step 410, by the thumbnail selection module 308.

Step 408 further involves determining how visually attractive the content of the frames are—i.e., the quality of the frame. In order to determine the quality of a frame, computational aesthetics techniques are utilized by the thumbnail selection module 308, where two versions of the module 308 can be implemented: unsupervised and supervised. In some embodiments, the unsupervised technique is based on a heuristic that uses the stillness score, discussed above, as the module 308 selects a thumbnail from each cluster by finding the smallest frame difference value within each cluster.

In some embodiments, the supervised technique performed by the module 308 is based on computational aesthetics framework techniques that assess the photographic attractiveness of images. Here, a set of visual features designed to capture various aesthetic properties are extracted, and a random forest regression model is trained on a set of images annotated with subjective aesthetic scores. This methodology is used to assign a quality score to each keyframe. Using this score, thumbnails can be selected, one per cluster, by finding the highest scoring quality score.

With the above framework established, the discussion will turn to a detailed description of the supervised model for frame quality (or attractiveness) scoring. In some embodiments, a 52-dimensional vector of visual features can be constructed by the thumbnail selection module 308 which captures a set of visual aesthetic properties of a frame(s). As an example of such properties, the below table provides a view of the type of properties, their features, their dimensional value ("Dim"), and a description of each property:

|  | Feature | Dim | Description |
| --- | --- | --- | --- |
| Color | Contrast | 1 | Ratio between luminance range and average luminance. |
|  | HSV | 3 | Average on each channel of Hue, Saturation, and Brightness. |
|  | HSV (Central) | 3 | Average HSV computed on the central quadrant of the image. |
|  | HSV Histograms | 20 | Histograms of HSV channels with 12, 3, and 5 bins. |
|  | HSV Contracts | 3 | Standard deviation of the HSV histograms. |
|  | Pleasure, Arousal, Dominance | 3 | Linear combination of HSV values according to visual perception statistics. |
| Texture | GLCM | 4 | Entropy, Energy, Contrast, and Homogeneity of the Gray-Level Co-Occurrence Matrix. |
| Basic Quality | Contrast Balance | 1 | The $l_2$ distance between an original image and contrast-equalized image. |
|  | Exposure Balance | 1 | Absolute value of the skewness of luminance histogram. |
|  | JPEG Quality | 1 | No-reference quality estimation algorithm. |
|  | Sharpness | 1 | Sum of image pixels filtered with Sobel masks. |
| Composition | Presence of Objects | 9 | Average saliency on 9 image sub-regions. |
|  | Uniqueness | 1 | The $l_2$ distance between image spectrum and average spectrum of natural images. |
|  | Symmetry | 1 | Difference between HOG feature vectors of left/right image halves. |

"Color" or color distribution is perhaps one of the most closely related properties to visual aesthetics. To evaluate the color composition and rendering, module 308 computes the following features: a Contrast metric based on luminance values; a set of Hue, Saturation, Brightness (HSV) statistics, including the Average HSV value for the whole image; the Central Average HSV value for the image central quadrant; the HSV Color Histograms, obtained by quantizing the values of HSV channels; the Pleasure, Arousal, Dominance statistics; and the HSV Contrasts (e.g., the standard deviation of the HSV histograms). In some embodiments, such computation is performed by the module 308 using any one of the above known or to be known techniques for determining and calculating parameter values of content in a video frame, as discussed above—for example, using a histogram, vector analysis, neural networks, and the like.

With reference to the "texture," an image frame's content texture can be determined by extracting the features of content, namely the Entropy, Energy, Homogeneity, Contrast of the Gray-Level Co-occurrence Matrix (GLCM), and the like, using any known or to be known statistical and structural technique for determining texture of an image, as discussed above.

"Quality" can be determined in accordance with four basic image quality metrics that capture the level of degradation on video frames, typically caused by post-processing and compression: Contrast Balance, computed as the $I_2$ distance between the original frame and its contrast-normalized version after luminance histogram equalization; the Exposure Balance, computed as the skewness of the luminance histogram; a JPEG Quality metric based on the presence of JPEG blocking artifacts, and the global Sharpness of an image within a frame.

"Composition" can be described with reference to a scene composition—that is, the arrangement of objects in an image frame, which can be determined by the module 308 analyzing the distribution of the spectral saliency across 3×3 image subdivisions, thereby capturing by how much the image follows the golden ratio associated with, for example, the Rule of Thirds. In some embodiments, module 308 computes the Symmetry feature, which captures the left-right symmetry of an image, and the Uniqueness feature, which captures the originality of the image composition.

According to some embodiments, the thumbnail selection module 308 can be trained to score frame aesthetics. In some embodiments, for example, the Aesthetic Visual Analysis (AVA) database can be employed. For example, an original dataset contains around 250,000 images with aesthetic, semantic and style labels. The dataset contains images and their corresponding scores downloaded from a photo contest website DPChallenge.com. In that website, professional/aspiring photographers get their photos voted by other photographers in terms of their quality, on a 10-point Likert scale. The aggregation of votes becomes the aesthetic score in the AVA dataset.

Accordingly, the thumbnail engine 300 can implement a supervised framework, as discussed above, to predict the aesthetic quality of video frames using a random forest regression model. In some embodiments, in order to perform such prediction, the module 308 of engine 300 optimizes the number of trees applied in such model via 5-fold cross validation. In other words, the random forest regression model is trained based on four splits (80% of the images) and tested on the remaining splits (e.g., 20%), and repeated five times. The number of trees can be varied from 1 to 200, and as a result, the setting of the number to 100 consistently provides results satisfying a quality and relevance threshold.

The average Mean Squared Error obtained from such analysis was 0.36 with a Multiple Correlation Coefficient (Pearson's correlation between predicted and real scores) of 0.49. Accordingly, such supervised modeling of the module 308 can be applied in Step 408 in order to compute the aesthetic score of all the extracted keyframes.

Continuing with Process 400, Step 412 involves the thumbnail selection module 308 automatically selecting a top ranked thumbnail candidate or set of candidates satisfying a threshold (where the ranking is performed in accordance with Steps 408-410). In Step 414, the selected thumbnail candidate can then be displayed in place of the input video (from Step 402). That is, when a candidate frame is selected, thumbnail selection module 308 can generate a thumbnail image based on the content of the selected frame. Such thumbnail generation from a video frame can be performed using any known or to be known thumbnail or image generation software, such as, for example, a batch processing program that converts a frame to a thumbnail image. Step 414 can be performed by the thumbnail selection module 308. As discussed above, the thumbnail, as understood by those of skill in the art, can take any form, including a still image, or a short-form motion image (e.g., a GIF). The thumbnail is interactive, and enables a user to view the video content of the input video upon interaction with the selected and displayed thumbnail.

By way of a non-limiting example of Process 400, an input video is uploaded to a user's Tumblr® page. Upon receiving the video, Steps 404-414 can be performed by the thumbnail engine 300, as discussed above. The video file is parsed and the frames of the video are identified as a set of frames. These frames are first subject to frame filtering where the transition frames and the low quality frames are discarded from the frame set. The remaining frames are then subject to keyframe extraction where duplicate frames are removed from the frames remaining in the set. The remaining frames of this set are then analyzed based on their relevance to the content or context of the video (e.g., how much does the content depicted in a frame correspond to the content of the video as a whole), and based on how aesthetically pleasing is such content (e.g., is the content "high-quality," for example, high resolution, high pixel count and/or high sharpness, and the like). In some embodiments, the frame with the highest relevance and quality is selected, and a thumbnail is generated from the selected frame, where it is displayed on the Tumblr® page. In some embodiments, the remaining frames can be ranked, where at least one frame from the ranked set is selected for thumbnail generation.

Thus, the disclosed subject matter provides systems and methods for automatically selecting highly relevant and high-quality image frames as content to be displayed within a generated thumbnail image. As discussed above, the disclosed systems and methods identify attractive thumbnails by analyzing various visual quality and aesthetic metrics, and perform a clustering analysis to determine the relevance to video content, thus making the resulting thumbnails more representative of the video.

FIG. 6 is a work flow example 600 for serving relevant digital media content associated with advertisements (e.g., digital advertisement content) based on the information associated with the identified media (or content), as discussed above in relation to FIGS. 3-5. Such information, referred to as "thumbnail information" for reference purposes only, can include, but is not limited to, analyzed information (i.e., information associated with and/or derived from the stored videos and/or videos' frames), the identity, context and/or type of media content being rendered and/or provided to a user as a thumbnail image, the content of such media, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises content relaying promotional content provided by a network associated third party.

By way of a non-limiting example, work flow 600 includes a user visiting another user's blog page such as for example a Tumblr® page and being presented a thumbnail image for a video that corresponds to highlight clips of last night's baseball game. Based on such information, the user may be provided with digital ad content related to special promotions provided by Major League Baseball® (MLB), such as, for example, promotional deals for purchasing tickets to the next game or purchasing MLB apparel.

In Step 602, thumbnail information is identified. As discussed above, the thumbnail information can be based any of the information form processes outlined above with respect to FIGS. 3-5. For purposes of this disclosure, Process 600 will refer to single provided/identified content object (e.g., a thumbnail image determined from a video file) as the basis for serving a digital advertisement(s); however, it should not be construed as limiting, as any number of thumbnails, identified content items, and/or quantities of information related to thumbnails, videos and/or thumbnail generation can form such basis, without departing from the scope of the instant disclosure.

In Step 604, a context is determined based on the identified thumbnail information. This context forms a basis for serving advertisements related to the thumbnail information. In some embodiments, the context can be determined by determining a category which the thumbnail information of Step 602 represents. For example, the category can be related to the content type of the media being represented by the thumbnail. In some embodiments, the identification of the context from Step 604 can occur before, during and/or after the analysis detailed above with respect to Process 400, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to view, search for and/or render the media (e.g., view the thumbnail or render the video, for example). Step 612. In some embodiments, the selected advertisement is sent directly to each user's computing device. In some embodiments, the selected advertisement is displayed in conjunction with the rendered and/or identified media associated with the displayed thumbnail on the user's device and/or within the application being used to view and/or render the media.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, via a computing device, a video comprising a plurality of video frames, each frame comprising an image;
   parsing, via the computing device, selected video frames of said plurality, and based on said parsing, identifying content features of each selected frame, the content features corresponding to an aesthetic of content depicted by each frames' image;
   filtering, via the computing device, the video based on the content features, and based on said filtering, identifying a frame set with content features having aesthetic values above a quality threshold, said quality threshold set such that a frame's image content within a type of frame depicts content at a predetermined visual aesthetic value, said content features of the identified frame set having aesthetic values above said quality threshold;
   analyzing, via the computing device, said frame set, and based on said analysis, determining a stillness value of each frame in said frame set;
   extracting, via the computing device performing keyframe extraction, a subset from said frame set based on the determined stillness values, said subset comprising a portion of frames within said frame set that have a stillness value at or below a threshold corresponding to a predetermined motion entry value of frame content, such that frames in said frame set with stillness values above said threshold are discarded; and
   generating, via the computing device, a graphics interchange format (GIF) file from said subset.

2. The method of claim 1, further comprising:
receiving, over a network, a request for a webpage; and
in response to said request, communicating said webpage, said communicated webpage comprising said GIF file such that upon display of said webpage, said GIF file is rendered causing the subset of frames to sequentially render.

3. The method of claim 1, wherein said filtering further comprises:
analyzing the frames of the video, and based on said analysis, determining a type of each frame; and
discarding, based on said quality threshold, a frame from said video frames when said frame type is a transition frame.

4. The method of claim 1, wherein said filtering further comprises:
analyzing the frames of the video, and based on said analysis, determining a quality value of each frame's content depicted in the respective image;
discarding, based on said quality threshold, a frame from said video frames when said quality value indicates the frame is a low-quality frame.

5. The method of claim 4, wherein said low-quality frames comprise content that is dark, blurry or uniform-colored.

6. The method of claim 1, wherein said aesthetic values correspond to at least one of a brightness value, sharpness value, colorfulness value and stillness value.

7. The method of claim 1, further comprising:
ranking the frames within said subset based on said visual similarity, wherein said GIF file is based on a second subset of frames selected from said subset, said second subset comprising frames having a predetermined similarity value above a predetermined level.

8. The method of claim 1, wherein said subset of frames extracted for said GIF file generation are sequentially located within said video.

9. A non-transitory computer-readable storage medium tangibly encoded with computer-executable instructions, that when executed by a computing device, perform a method comprising:
identifying, via the computing device, a video comprising a plurality of video frames, each frame comprising an image;
parsing, via the computing device, selected video frames of said plurality, and based on said parsing, identifying content features of each selected frame, the content features corresponding to an aesthetic of content depicted by each frames' image;
filtering, via the computing device, the video based on the content features, and based on said filtering, identifying a frame set with content features having aesthetic values above a quality threshold, said quality threshold set such that a frame's image content within a type of frame depicts content at a predetermined visual aesthetic value, said content features of the identified frame set having aesthetic values above said quality threshold;
analyzing, via the computing device, said frame set, and based on said analysis, determining a stillness value of each frame in said frame set;
extracting, via the computing device performing keyframe extraction, a subset from said frame set based on the determined stillness values, said subset comprising a portion of frames within said frame set that have a stillness value at or below a threshold corresponding to a predetermined motion entry value of frame content, such that frames in said frame set with stillness values above said threshold are discarded; and
generating, via the computing device, a graphics interchange format (GIF) file from said subset.

10. The non-transitory computer-readable storage medium of claim 9, further comprising:
receiving, over a network, a request for a webpage; and
in response to said request, communicating said webpage, said communicated webpage comprising said GIF file such that upon display of said webpage, said GIF file is rendered causing the subset of frames to sequentially render.

11. The non-transitory computer-readable storage medium of claim 9, wherein said filtering further comprises:
analyzing the frames of the video, and based on said analysis, determining a type of each frame; and
discarding, based on said quality threshold, a frame from said video frames when said frame type is a transition frame.

12. The non-transitory computer-readable storage medium of claim 9, wherein said filtering further comprises:
analyzing the frames of the video, and based on said analysis, determining a quality value of each frame's content depicted in the respective image;
discarding, based on said quality threshold, a frame from said video frames when said quality value indicates the frame is a low-quality frame.

13. The non-transitory computer-readable storage medium of claim 12, wherein said low-quality frames comprise content that is dark, blurry or uniform-colored.

14. The non-transitory computer-readable storage medium of claim 9, wherein said aesthetic values correspond to at least one of a brightness value, sharpness value, colorfulness value and stillness value.

15. The non-transitory computer-readable storage medium of claim 9, further comprising:
ranking the frames within said subset based on said visual similarity, wherein said GIF file is based on a second subset of frames selected from said subset, said second subset comprising frames having a predetermined similarity value above a predetermined level.

16. The non-transitory computer-readable storage medium of claim 9, wherein said subset of frames extracted for said GIF file generation are sequentially located within said video.

17. A computing device comprising:
a processor; and
a non-transitory computer-readable storage medium for tangibly storing thereon program logic for execution by the processor, the program logic comprising:
logic executed by the processor for identifying, via the computing device, a video comprising a plurality of video frames, each frame comprising an image;
logic executed by the processor for parsing, via the computing device, selected video frames of said plurality, and based on said parsing, identifying content features of each selected frame, the content features corresponding to an aesthetic of content depicted by each frames' image;
logic executed by the processor for filtering, via the computing device, the video based on the content features, and based on said filtering, identifying a frame set with content features having aesthetic values above a quality threshold, said quality threshold set such that a frame's image content within a type of frame depicts content at a predetermined visual aesthetic value, said content features of the identified frame set having aesthetic values above said quality threshold;

logic executed by the processor for analyzing, via the computing device, said frame set, and based on said analysis, determining a stillness value of each frame in said frame set;

logic executed by the processor for extracting, via the computing device performing keyframe extraction, a subset from said frame set based on the determined stillness values, said subset comprising a portion of frames within said frame set that have a stillness value at or below a threshold corresponding to a predetermined motion entry value of frame content, such that frames in said frame set with stillness values above said threshold are discarded; and logic executed by the processor for generating, via the computing device, a graphics interchange format (GIF) file from said subset.

18. The computing device of claim 17, further comprising:

receiving, over a network, a request for a webpage; and in response to said request, communicating said webpage, said communicated webpage comprising said GIF file such that upon display of said webpage, said GIF file is rendered causing the subset of frames to sequentially render.

* * * * *